Aug. 28, 1928.
W. S. SMITH
SCALE
Filed June 6, 1927
1,682,355
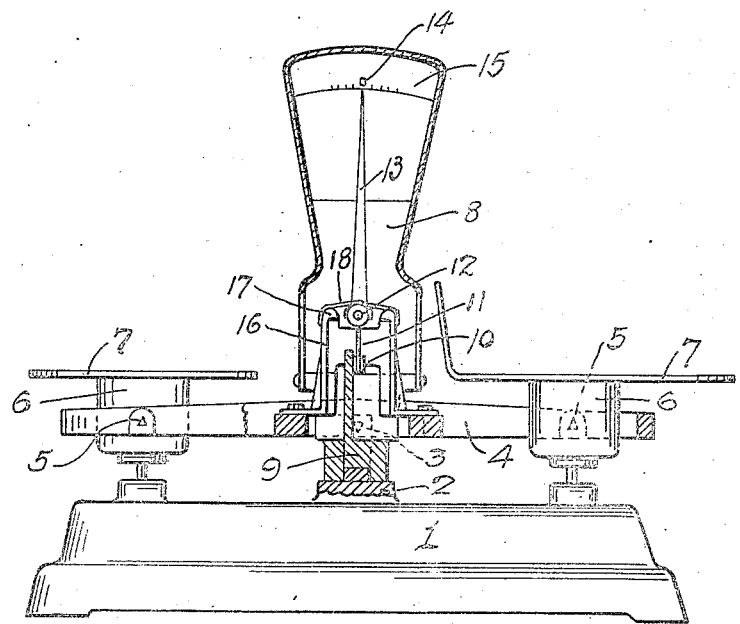
FIG. 1
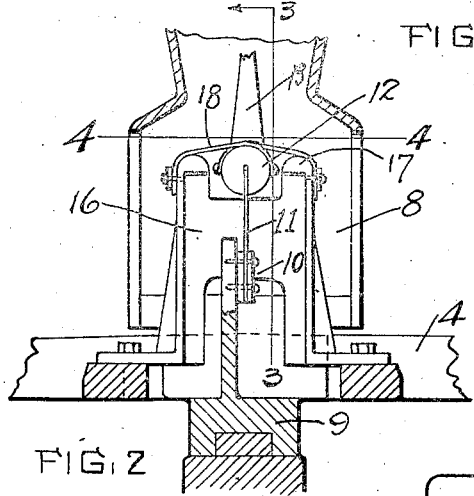
FIG. 2
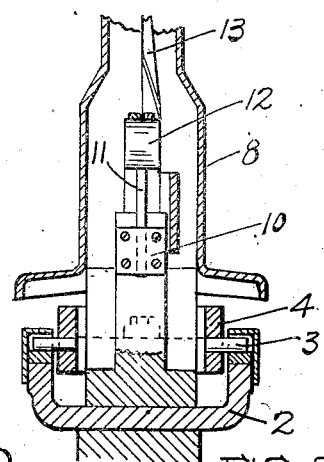
FIG. 3
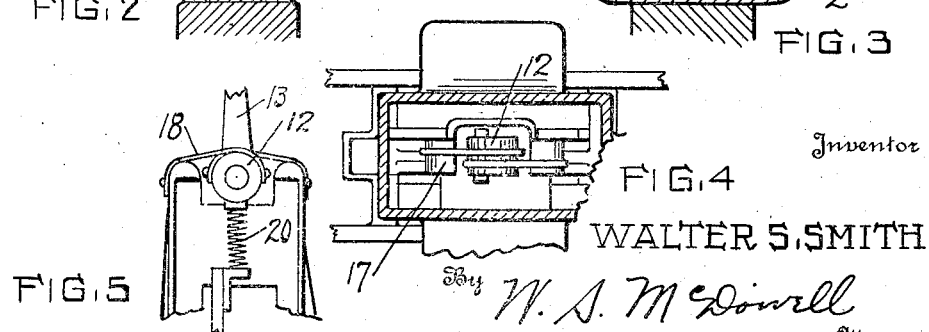
FIG. 4
FIG. 5
Inventor
WALTER S. SMITH
By W. A. McDowell
Attorneys Patented Aug. 28, 1928.

1,682,355

UNITED STATES PATENT OFFICE.

WALTER S. SMITH, OF COLUMBUS, OHIO.

SCALE.

Application filed June 6, 1927. Serial No. 196,746.

This invention relates to improvements in scales, and has for its primary object the provision of a scale of delicate and accurate balance by means of which slight differences in weights upon the opposite ends of the pivoted beam of the scale, as well as the true balance of the beam, may be quickly and readily noted by the scale operator.

Another object of the invention resides in the provision of a scale which constitutes a variation of or an improvement upon the form of scale disclosed in my prior Patent Number 1,405,634 issued February 7, 1922. In this patent there is disclosed a scale comprising essentially an even balanced beam, a torsion strip mounted independently of the beam, a flexible connecting means between the torsion strip and the beam for maintaining the latter in neutral position irrespective of the position of the scale with respect to the true horizontal. In this structure a torsion strip is provided consisting of a thin metallic strip having its ends rigidly secured to the frame of the scale so that upon the oscillation of the beam a twisting movement will be imparted to the center of the strip so as to place the latter under stresses when the beam is deflected from neutral and to thereby enable the beam to be returned to its neutral position when the influence deflecting the beam is removed.

While the torsion strip serves effectively in carrying out the several functions assigned thereto nevertheless by reason of the severe twisting forces applied thereto, continued use will result frequently in the crystallization of the metal constituting the strip or the fracture or tearing thereof. The present invention aims to provide a structure wherein an even balanced beam will be returned to neutral by means of a peculiarly situated flexible spring member which is mounted upon the frame of the scale independently of the beam and arranged to have a flexible frictionless connection with the beam upon opposite sides of its fulcrum point so that when the beam is deflected to either side of a neutral position, stresses will be set up in the spring member tending to return the beam to neutral, the arrangement and construction of the spring member being such that the deflection of the beam will have but little or no destructive action upon the material from which the spring member is formed, in order that the life of the latter under like conditions of service will be materially greater than the ordinary torsion strip.

With these and other objects in view, as will appear as the description proceeds, the invention consists in the novel features of construction, combinations of elements and arrangements of parts and hereinafter to be fully described and pointed out in the appended claims.

In the accompanying drawing:

Figure 1 is a side elevation, partly in vertical section, of the improved scale comprising the present invention, Figure 2 is an enlarged vertical sectional view taken through the cooperating portions of the movable beam, the spring strip, and the connection between the strip and the beam, Figure 3 is a vertical sectional view on the line 3—3 of Figure 2, Figure 4 is a transverse sectional view on the line 4—4 of Figure 2, and Figure 5 is a detail view disclosing a modified form of spring member.

Referring more particularly to the details of the invention and specially the specific embodiment thereof disclosed in Figures 1 to 4, the numeral 1 designates the base or frame of a scale. Provided upon the base is a substantially U shaped bracket 2, which supports a knife edge structure 3 carrying an even balanced pivotally movable beam 4. The outer ends of the beam have pivotally connected therewith by means of knife edges 5 a pair of stems 6 which are adapted to rise and fall in unison with the oscillations of the beam 4 and carry weight receiving pans or platters 7.

In order to provide a self contained or self sustaining scale, i. e. one independent of careful positioning such as is necessitated in the employment of pendulum scales, I construct the base or frame 1 to include an upright tower 8 constituting a casing into the lower end of which projects an upright wall 9, suitably formed with the base 1 and arranged independently of the balance and movement of the beam 4. To the upper end of the wall 9 there is rigidly clamped as at 10 the lower portion of a spring member 11, which in its preferred adaptation is in the form of a leaf spring. The upper free end of the spring has secured thereto a hub 12 having a circular outer periphery, and to this hub I secure an indicating pointer 13. The normal inflexed position of the spring member 11 tends to maintain the pointer at the zero reading provided upon a graduated scale 15 disclosed in the upper part of the tower 8. By flexing the spring member 11 the free extremity of the pointer 13 will be permitted to travel arcuately over the scale 15 so as to denote the extent of deflection of the beam 4 from a neutral position.

To impart travel to the indicator 13 and to effect the flexing of the spring member 11, the beam 4 is provided with a pair of upright brackets 16 spaced equadistantly on opposite sides of its fulcrum 3. These brackets extend upwardly into the lower end of the tower 8 and terminate adjacent the hub 12, the upper portions of said brackets being provided with segmental or arcuate surfaces 17. Secured to the brackets 16 adjacent to the surfaces 17 are the ends of flexible straps 18, which have their opposite ends trained around the circular outer wall of the hub 12 and suitably secured to said hub as indicated by the numeral 19. It will be thus apparent that the straps 18 have rolling engagement with the hub 12 and also with the surface 17 provided upon the brackets 16.

In operation, it will be seen that the normal tendency and effort of the spring member 11 is to retain the beam 4 and the indicator 13 in neutral positions. This structure results in the provision of a highly developed type of scale and one wherein the level of the scale as a whole is of no importance so far as the weighing action thereof is concerned and its capacity for indicating true weights. As long as the spring strip is not distorted or bent, and there is no load on the beam of the scale, the plumbness or operative position of the scale is not effected. The weighing effect due to the spring strip of the scale is the same as that accomplished by the ordinary pendulum, except that a pendulum requires a scale to be leveled in order to obtain a correct weight, thereby resisting vertical alignment of the beam fulcrum and the pendulum when the correct weight is reached. In the present scale all that is necessary is that the spring member must have substantially all of the flex taken out of it when the correct weight is reached, and the indication of this removal of flex is automatical by the inherent equality of the material from which it is formed. It will be noted that if the beam is fulcrumed at its center of gravity, it will be in equilibrium no matter what may be its position of angularity, and therefore it makes no difference in operation whether this beam is horizontal or inclined, since it will be in a neutral position when the flex or bend has been removed from the spring member by release of the applied weight. Further, the structure avoids the sever twisting of the material constituting the spring member, as is the case when a torsion strip is employed. Consideration of the drawings will show that the spring will be permitted to bend freely about its connection with the wall 9 in a graceful easy bend without taxing the strength of the material. Further, the oscillations of the beam are kept within reasonable limits so that straining of the metal comprising the spring members is effectually precluded. In the form of the invention disclosed in Figure 5 a tightly wound coil spring 20 is employed in lieu of the flat leaf spring set forth in the preferred form. Either type of spring member will perform efficiently in the scale as will other equivalent devices which the following claims are intended to cover.

What is claimed is:

1. The combination with the movable beam of a scale, of a spring strip supported at one end independently of the beam, and a connecting element extending between said beam and a flexibly movable portion of said strip, said strip carrying a bar with which said element has rolling engagement and positioned to normally maintain said beam in a neutral position.

2. In a scale, a supporting frame, a movable beam and means exerting an influence maintaining said beam when unweighted in a neutral position, said means functioning irrespective of the level of the supporting frame, and said means including a spring strip fixed to said frame and supported independently of the beam, and a flexible connecting element connected to said beam and having non-rubbing engagement with the flexible portion of said strip.

3. The combination with the movable beam of a scale, of a spring strip supported upon said scale independently of the beam, a drum carried by the flexing portion of said strip, flexible connecting means operatively connected with said beam and said drum so that said strip is flexed by the movement of the beam from neutral, an indicating means operated by the flexing of said strip.

4. In a scale comprising a pivoted beam, a flat spring strip independent of the pivotal mounting of said beam, an indicator arm carried by said strip, a drum carried by said strip, a flexible connecting means attached to said beam and operatively engaging said drum to flex said strip from a normal position when the beam is moved from its neutral position.

5. A scale comprising a pivoted beam, a spring member above the beam fulcrum, an indicator arm operatively connected to said member, a drum carried by said member, a flexible connection operatively engaging said drum and attached at its two outer ends to said beam on opposite sides of the fulcrum of said beam.

6. A scale comprising a pivoted beam, a flexible spring strip supported independently of the pivotal mounting of said beam, an indicator arm carried by said strip, a drum carried by said strip, a flexible connecting means attached to said beam and operatively engaging said drum to flex said strip when the beam is moved from neutral position, and rigid arms rising from said beam and having circular working faces with which the outer ends of said connecting means have engagement.

7. A scale comprising a pivoted beam, a flexible spring strip carried above the beam fulcrum, an indicator arm operatively carried by said strip, a drum carried by said strip, a flexible means operatively engaging said drum at its center and attached at its two ends to said beam on opposite sides of the fulcrum of said beam, the points of attachment, the size of said drum being in such relation that the beam movement is registered by a perceptively multiplied movement of the indicator arm.

8. A scale comprising a pivoted beam, a spring strip independent of the pivotal mounting of said beam, an indicator arm operatively attached to said strip at its upper flexing end, spaced upright arms arising from said beam and spaced equadistantly from the pivotal mounting thereof, and flexible connections between the upper flexing end of said strip and the upper ends of said beam arms.

9. The combination with the movable beam of a scale, of a spring member arranged above the fulcrum of said beam and having the lower end thereof rigidly secured to said scale independently of the beam, an indicator arm connected to the free flexing end of said strip, spaced arms arising from said beam and spaced equadistantly from the fulcrum thereof, a flexible connecting means between the upper ends of said arms and said strip, the contacting portions of said arms and strip engaging with said flexible connecting means having arcuate faces.

In testimony whereof I have affixed my signature.

WALTER S. SMITH.